United States Patent [19]

Shea et al.

[11] 4,232,585
[45] Nov. 11, 1980

[54] POWER STEERING GEAR WITH FLOW CHECK VALVE

[75] Inventors: James M. Shea; Michael F. Tobin; Stanley E. Anderson, all of Saginaw, Mich.

[73] Assignee: General Motors Corporation, Detroit, Mich.

[21] Appl. No.: 951,964

[22] Filed: Oct. 16, 1978

[51] Int. Cl.³ ................. F15B 13/042; F16K 15/06
[52] U.S. Cl. ........................................ 91/432; 91/446; 137/515.5; 137/542
[58] Field of Search .......... 91/446, 468, 432; 137/542, 543.13, 515.5; 180/132, 141

[56] References Cited

U.S. PATENT DOCUMENTS

| | | | |
|---|---|---|---|
| 1,785,271 | 12/1930 | Lemex | 137/515.5 |
| 2,949,928 | 8/1960 | Hobson | 137/542 X |
| 3,022,772 | 2/1962 | Zeigler et al. | |
| 3,070,112 | 12/1962 | Fricke et al. | 137/542 X |
| 3,184,921 | 5/1965 | Allen | 91/446 X |
| 3,246,472 | 4/1966 | Kries | 180/132 X |
| 3,751,002 | 8/1973 | Folkerts et al. | |
| 3,941,033 | 3/1976 | Olsen | 91/446 |
| 3,952,510 | 4/1976 | Peterson | 180/141 X |

FOREIGN PATENT DOCUMENTS 2330168  1/1975 Fed. Rep. of Germany ........... 137/542

Primary Examiner—Irwin C. Cohen
Attorney, Agent, or Firm—Charles R. White

[57] ABSTRACT

A power steering gear having a piston nut fed with pressure fluid from a source through a rotary valve. The construction includes a special one-way valve assembly in the high pressure port which is formed by a plunger which seats into the end of the steel tube of the power steering hose. The plunger tube and external O-ring provides for improved sealing of the power steering gear to prevent external leaks and to provide for improved control of flow into the housing from the source and to block flow from the housing into the high pressure port so that road excited vibrations are not fed back to the vehicle handwheel.

4 Claims, 3 Drawing Figures

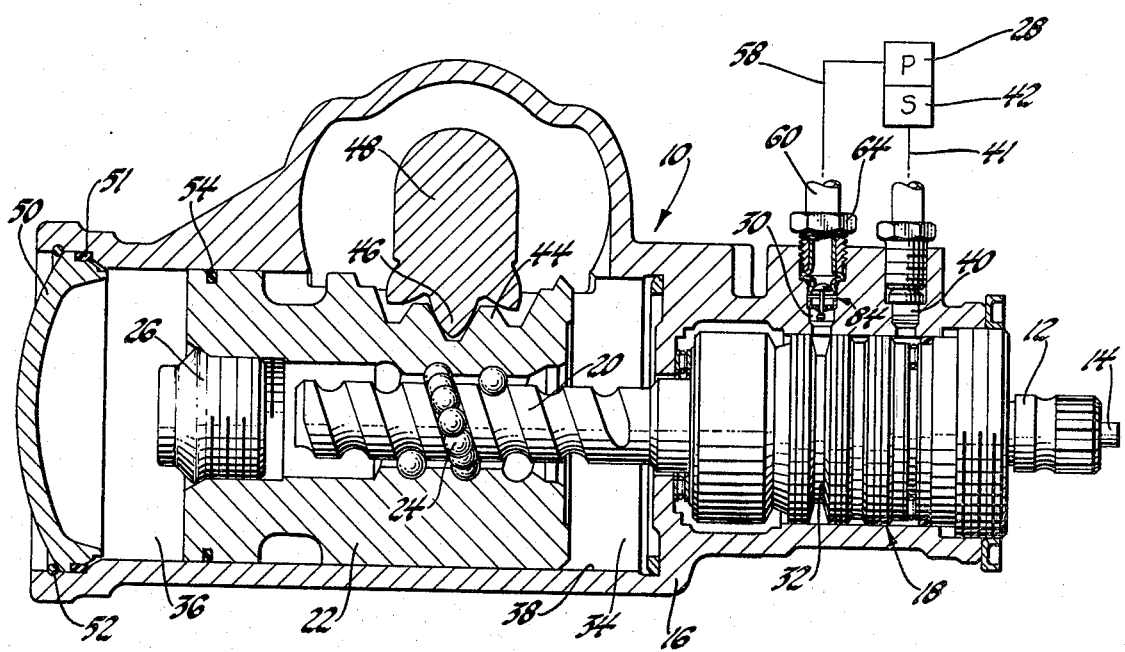
Fig. 1
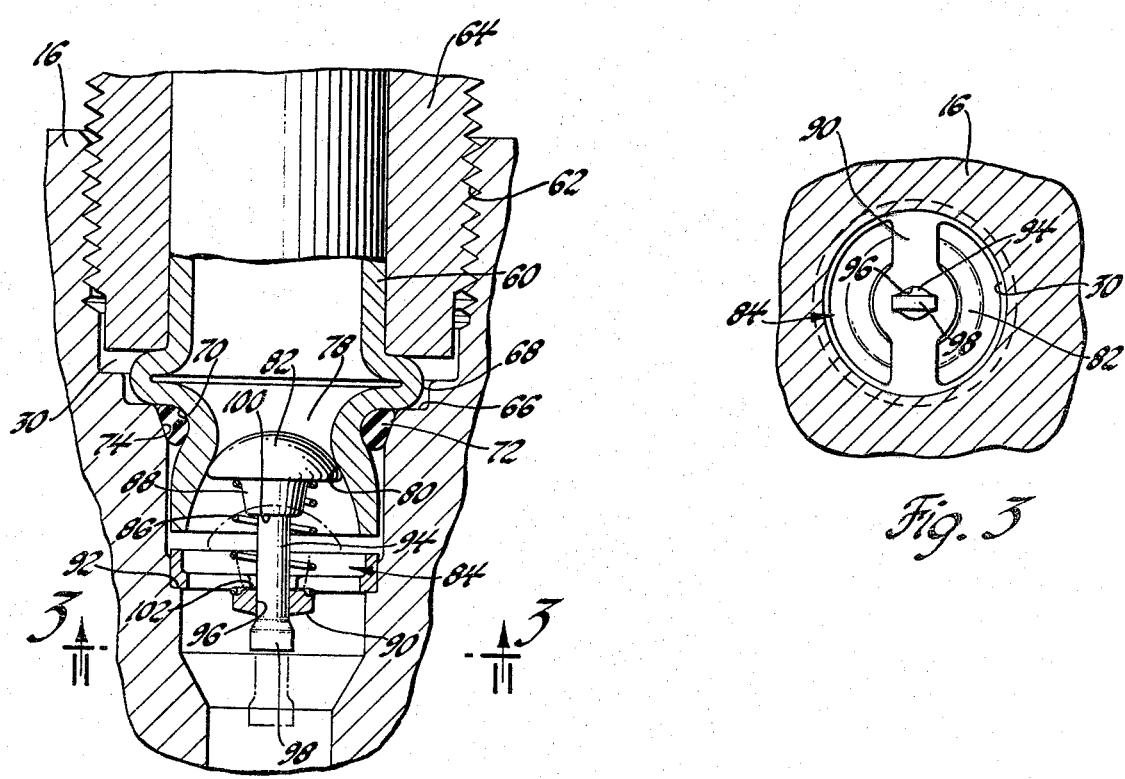
Fig. 2
Fig. 3

POWER STEERING GEAR WITH FLOW CHECK VALVE

This invention relates to hydraulic power steering gears and more particularly to a power steering gear with a new and improved flow check valve assembly in the hydraulic pressure supply port of the gear housing to prevent reverse flow of hydraulic fluid to the pressure source from the pressure side of the gear so that road excited vibrations are not fed to the vehicle handwheel.

Handwheel vibrations in an automotive vehicle are sometimes caused by external loads from rough road or other causes induced into the steering gear pitman shaft. The consequent reversal of motion of the pitman shaft and rack piston components can cause a reversal of hydraulic fluid flow which may be felt as vibration in the handwheel of a vehicle. Such handwheel motions have been successfully reduced or substantially eliminated to a point where these are not objectionable by the use of a one-way check valve in the pressure supply port of the power gear. In many prior power gears, this check valve comprises a stamped metal poppet which seats against the lower side of a brass flare connector and which is preloaded into blocking position by a conical spring. Normal hydraulic flow from the power steering pump into the power steering gear unseats the stamped poppet. Reversal or stoppage of the flow causes the stamped poppet to seat and restrict the feedback through the system. While the prior constructions have been effective in eliminating or reducing handwheel vibrations, they are costly and involve a plurality of small and separate components requiring tedious work as they are sequentially installed into the power gear. These prior check valve components have to be carefully installed for proper alignment and sealing.

With the above in mine, it is a feature, object and advantage of this invention to provide a new and improved cartridge-type check valve for a power steering gear to operate in conjunction with the end of a pressure hose to provide new and improved one-way valving in the power steering gear to eliminate or substantially reduce handwheel vibrations induced by loads external of the vehicle.

Another feature, object and advantage of this invention is to provide a new and improved cartridge-type check valve having a stamped retainer with a plunger slidably mounted in the retainer and yieldably mounted with respect to the retainer by a spring and forming a coupled valve assembly which can be inserted as a unit into a pressure port of a power gear and which cooperates with the seat or throat portion of a metallic tube of a power steering hose to form an effective one-way check valve to prevent the reversal of flow of fluid in the power gear pressure supply line so that external induced loads on the pitman shaft are not transmitted to the vehicle handwheel.

Another feature, object and advantage of this invention is to provide a new and improved connection between the pressure supply line of a power steering gear pump and a power steering gear which provides for improved sealing between the power steering gear hose tube and the power gear housing and which further provides for the improved flow of fluid into the system from the pump and which features a one-way check valve that directly cooperates with a seat or throat portion in the power steering gear hose tube to block a reversal of flow into the power steering pump so that hydraulic fluids are contained within the gear for absorption of motions induced into the gear through the output member thereof.

These and other features, objects and advantages of this invention will become more apparent from the following detailed description and drawings in which:

FIG. 1 is a side elevational view partly in section of an integral power steering gear with the one-way flow control valve assembly in accordance with this invention;

FIG. 2 is an enlarged view partly in cross section of a portion of the housing of the power gear of FIG. 1 illustrating details of the one-way flow control valve assembly of this invention; and FIG. 3 is a view taken along lines 3–3 of FIG. 1 illustrating components of the one-way flow control valve of this invention.

Turning now in greater detail to the drawings, there is shown in FIG. 1, a power steering gear 10 having an elongated stub shaft 12 with a torsion bar 14 extending axially therethrough, operatively mounted in a power steering gear housing 16. The stub shaft and torsion bar are operatively connected to the valve body and spool of a rotary valve assembly 18 mounted in the housing concentric with respect to the stub shaft for controlling the hydraulic operation of the steering gear as disclosed and explained in the U.S. Pat. No. 3,022,772 to Zeigler et al for "Rotary Power Steering Valve with Torsion Bar Centering" and in U.S. Pat. No. 4,009,641 to Robert P. Rohde et al for "Compact Power Steering Gear". These patent disclosures are hereby incorporated by reference into this specification.

An elongated and rotatable screw or worm 20 extends axially in housing 16 from the inboard end of valve assembly 18 into a central bore in a piston nut 22 operatively mounted in the housing. Balls 24 constitute the connection between the piston nut and worm; a return tube, not shown, allows for recirculation of the balls in a conventional manner well understood in this art. A hollow cap 26 closes the outer end of the piston nut bore to prevent the passage of fluid therethrough. The valve assembly 18 is fed with pressure fluid from a power steering pump 28 through a pressure port 30 formed in power steering gear housing 16 which communicates with annular high pressure groove 32 peripherally formed in the valve body of the valve assembly. The valve body is relatively rotatable with respect to the valve spool to control the supply and exhaust of fluid to and from expandable and contractible pressure chambers 34 and 36 formed on either side of the piston nut 22 slidably mounted in a bore 38 formed in the power steering gear housing. Passages in the power steering gear housing, not shown, hydraulically connect chambers 34 and 36 with the valve assembly 18. A return port 40 in housing 16 feeds fluid from the valve assembly 18 back to a tube and hose assembly 41 connected to a power steering sump 42 which is hydraulically connected to pump 28 as more fully described in the above referenced patents to Zeigler et al and Rohde et al.

The piston nut 22 has a rack whose teeth 44 mesh with the teeth 46 of a sector gear 48 of a pitman shaft mounted for limited turning movement in the housing 16. The sector gear 48 and pitman shaft is operatively connected through associated steering linkage to the dirigible wheels of the vehicle which are not shown. The piston bore 38 of the steering gear housing is closed in a fluid tight manner by a suitable cap 50 and annular seal 51 and are secured in one end of the housing by fastener ring 52. As shown, the worm 20 extends axially from the inner end of the valve assembly in the housing toward the plug 26 which is screwed into the bore of the piston nut and which is hollow to accomodate axial movement of the piston nut under certain operating conditions. An O-ring 54 mounted in an annular groove in the outer periphery of the piston nut 22 contacts the inner wall of the bore 38 to provide an outer sliding seal for the separate fluid chambers 34 and 36.

A pressure hose illustrated diagrammatically by line 58 connects pump 28 to a cylindrical, thin-walled steel tube 60 which is inserted into the pressure port 30. As shown in FIG. 2, the pressure port 30 has a threaded internal diameter portion 62 for receiving an externally threaded fitting nut 64 disposed around the tube 60 and a stepped radial shoulder 66 that provides a seat for a locating and sealing ring portion 68 swaged and radially expanded from the wall of the steel tube adjacent the lower end thereof. Metal-to-metal contact by the ring portion 68 of the tube and the shoulder 66 of the bore when the fitting nut is installed provides for improved fastening of the tube in the power gear housing and for improved fluid sealing. As best shown by FIG. 2, the wall of tube 60 is radially inwardly constricted below the sealing ring portion 68 to form an annular groove 70 to accommodate an elastomer O-ring 72 which is adapted to engage a flared wall portion 74 of the pressure port 30 to provide for a redundant fluid tight seal between the tube 60 and the gear housing 16.

From the above, it will be seen that the nut 64 when sufficiently threaded into the pressure port 30 will seat and trap the ring portion 68 against radial shoulder 66 so that the tube is firmly secured in place in a fluid tight manner against the radial shoulder. Also, when the nut 64 is tightened down and the ring portion of tube 60 is seated, the elastomer O-ring is deflected so that it flows tightly against the flared wall 74 of the bore for effective fluid sealing.

In addition to wall deformation to form the sealing ring portion 68 and the O-ring retainer constriction 70, the wall of the inner end of the tube 60 is deformed into a bell-shaped configuration with a generally elliptical inner annular surface which opens from the terminal end of the tube and is progressively restricted to a small diameter throat portion 78. The interior surface 80 of the tubing wall immediately below the throat 78 provides an annular sealing seat for the head 82 of an axially movable plunger of the check valve assembly 84. As shown in FIG. 2, the plunger is biased into seated position by a helical spring 86 which at its upper end is disposed around a conical pilot 88 formed on the underside of head 82. The inner or lower end of this spring is seated on the inner side of a stamped retainer 90 which is adapted to seat against annular shoulder 92 of the high pressure port 30. Extending inwardly from the conical pilot is a cylindrical stem 94 which slidably projects through a centralized hole 96 pierced through the retainer. The lower end of the stem extending beyond the extremity of the retainer is flattened at 98 or is otherwise deformed to prevent passage of the stem completely through the hole 96. With this construction, the plunger, spring and retainer form a unitized check valve assembly which can be easily handled and installed as opposed to the multiple separate parts of the prior art check valves. The lower end of the conical pilot forms a stop surface 100 which is adapted to engage a corresponding surface 102 on the retainer under certain operating conditions to prevent clash of the coils of spring 86 and to prevent overstressing of the spring.

In operation, high pressure fluid fed to the rotary valve 18 will cause the deflection of the one-way check valve plunger downwardly as indicated by the phantom lines in FIG. 2 so that pressure oil is fed into the high pressure groove 32 of the rotary valve. When the rotary valve is actuated, pressure oil is fed from the groove 32 to chamber 34 or chamber 36 as determined by direction of rotation of the stub shaft as the other chamber is hydraulically connected to exhaust port 40. In the event of oscillations induced into the power gear from road obstacles or other causes, the check valve assembly closes to prevent flow from the pressure side of the system back to the pump. Thus, when the handwheel is being turned, the external load from road obstacles cannot effectively move the piston since the pressure chamber will close. With the check valve preventing a reverse flow to the pump, road excited vibrations are not fed back to the rotary valve and handwheel.

From the above it will be appreciated that this invention provides a new and improved check valve construction that seats into a mating pressure tube connection so as to dampen resonant feedback of external loads introduced into the steering gear pitman shaft. The unitized valve assembly provides important advantages in reducing tedious and time consuming assembly operation as compared to multi-part prior art one-way valve constructions. Also, the construction is less sensitive to alignment and there is more reliable sealing. Importantly, with this invention, advantageous use is made of the hose tube to provide improved fluid sealing into the power steering gear housing while providing the seat for the one-way valve.

While a preferred embodiment of this invention has been shown and described to illustrate the invention, other embodiments will become apparent to those skilled in the art. Accordingly, the scope of this invention is set forth in the following claims.

We claim:

1. A hydraulic power unit comprising a housing, a piston mounted for sliding movement in said housing and cooperating therewith to form a pair of expansible and contractible fluid chambers, output means operatively connected to said piston and extending from said housing, a source of fluid pressure, a pressure port and an exhaust in said housing, a fluid passage tube operatively connecting said source to said pressure port, said tube having one end seated in said pressure port, said tube extending externally of said housing and having its other end connected to said source, manual input means extending into said housing, valve means connected to said input means hydraulically connected to said pressure port and said exhaust, said value means being operatively mounted in said housing to feed and exhaust fluid from said fluid chambers, a one-way check valve in said pressure port, said one-way check valve comprising a valve element and a spring for biasing said valve element in one direction and a retainer for said spring and valve element, said valve element being operatively connected to said spring and retainer to form a unitized assembly, said valve element having a head portion, and valve seat means formed directly in said one end of said fluid passage tube to cooperate with said head portion to block the fluid flow fromm said chamber to said source of pressure to prevent external loads imposed on said output means from being fed through said gear to said input.

2. A hydraulic power unit comprising a housing, a piston mounted for sliding movement in said housing and cooperating therewith to form a pair of expansible and contractible fluid chambers, output means operatively connected to said piston and extending from said housing, a source of fluid pressure, a pressure port and an exhaust in said housing, thin-walled tube means hydraulically connecting said source to said pressure port, said tube means having one end fitted into said pressure port, said tube means extending externally of said housing and having its other end connected to said source, manual input means extending into said housing, valve means connected to said input means hydraulically connected to said pressure port and said exhaust, said valve means being operatively mounted in said housing to feed and exhaust fluid from said fluid chambers, a one-way check valve in said pressure port, said one-way check valve comprising a valve element and a spring for biasing said valve element in one direction and a retainer for said spring and valve element, said valve element having a head portion and a stem extending from said head portion through said retainer, said spring being a helical spring disposed around said stem and seated on said retainer and engaging said head portion for biasing said head portion away from said retainer, stop means on the free end portion of said stem extending through said retainer to prevent said stem from being biased by said spring through said retainer to thereby couple said retainer and said valve element and said spring into a unitized assembly, and valve seat means formed in the internal wall of said one end of said tube means to cooperate with said head portion to block the fluid flow from said chamber through said tube means.

3. A hydraulic power unit comprising a housing, a piston mounted for sliding movement in said housing and cooperating therewith to form a pair of expansible and contractible fluid chambers, output means operatively connected to said piston and extending from said housing, a source of fluid pressure, a pressure port and an exhaust in said housing, a thin-walled tube connecting said source to said pressure port, said tube having one end fitted in said pressure port, said tube extending externally of said housing and having its other end connected to said source, manual input means extending into said housing, valve means connected to said input means hydraulically connected to said pressure port and said exhaust, said valve means being operatively mounted in said housing to feed and exhaust fluid from said fluid chambers, a one-way check valve in said pressure port, said one-way check valve comprising a valve element and a helical spring for biasing said valve element in one direction and a retainer for said spring and valve element, said valve element having a stem disposed within the coils of said spring with a free end portion extending through sid retainer, said free end portion being deformed to operatively connect said spring and retainer and said valve element to form a unitized assembly, said valve element having a head portion, and valve seat means formed by the internal wall of said one end of said tube for sealing engagement with said head portion to block the fluid flow from said chamber to said source of pressure through said tube to prevent external loads imposed on said output means from being fed through said gear to said input.

4. A hydraulic unit having a fluid port provided in the housing thereof, a metallic thin-walled fluid conducting tube generally cylindrical in form having one end mounted in the fluid port of said housing, said tube extending externally of said housing for connection with a remote source; said one end of said tube having an integral rim portion extending radially outwardly and seated on a radial shoulder of said port and having an enternal constriction adjacent to said radially extended rim portion to form a valve seat internal of said tube and by the inner wall thereof, a check valve assembly for said tube, said check valve assembly comprising a valve plunger having a head portion engaged with said valve seat, said plunger having a stem extending from said head portion, a retainer having a centralized opening therein receiving the free end of said stem, a spring disposed around said stem and mounted between said head and said retainer to bias said head into fluid sealing engagement with said valve seat, and limit means on the stem extending through said retainer to prevent said plunger from being biased in one direction by said spring through said retainer and thereby form a unitized check valve assembly for said housing.

* * * * *

UNITED STATES PATENT AND TRADEMARK OFFICE
CERTIFICATE OF CORRECTION

PATENT NO. : 4,232,585

DATED : Nov. 11, 1980

INVENTOR(S) : James M. Shea; Michael F. Tobin; Stanley E. Anderson

It is certified that error appears in the above-identified patent and that said Letters Patent are hereby corrected as shown below:

Column 4, line 67, "fromm" should read -- from --.

Column 6, line 12, "sid" should read -- said --.

Column 6, line 31, "enternal" should read -- integral --.

Signed and Sealed this

Nineteenth Day of May 1981

[SEAL]

Attest:

RENE D. TEGTMEYER

Attesting Officer     Acting Commissioner of Patents and Trademarks